(12) United States Patent
Chieh et al.

(10) Patent No.: US 6,964,423 B1
(45) Date of Patent: Nov. 15, 2005

(54) COLLAPSIBLE CROSS-ARM DOLLY

(76) Inventors: Peter T. C. Chieh, 18424 Mount Langley St., Fountain Valley, CA (US) 92708; Franklin W. Baker, 5642 S. LaBrea, Apt. 9A, Los Angeles, CA (US) 90056

( * ) Notice: Subject to any disclaimer, the term of this patent is extended or adjusted under 35 U.S.C. 154(b) by 128 days.

(21) Appl. No.: 10/421,022

(22) Filed: Apr. 24, 2003

(51) Int. Cl.[7] ................................. B62B 1/00
(52) U.S. Cl. ................ 280/79.11; 280/79.2; 280/79.5; 248/129
(58) Field of Search ............................. 280/651, 645, 280/47.19, 47.23, 47.26, 79.11, 79.2, 79.3, 280/79.4, 79.5, 79.6, 79.7; 248/129, 170, 248/178.1

(56) References Cited

U.S. PATENT DOCUMENTS

| | | | | |
|---|---|---|---|---|
| 375,406 | A * | 12/1887 | Wilson et al. | 280/79.11 |
| D27,784 | S * | 10/1897 | Gander | D34/23 |
| 1,918,604 | A * | 7/1933 | Johnson | 280/79.5 |
| 2,500,215 | A * | 3/1950 | Swearingen | 280/79.2 |
| 3,554,573 | A * | 1/1971 | Miller | 280/79.2 |
| 3,734,527 | A * | 5/1973 | Bard | 280/79.5 |
| 3,802,717 | A * | 4/1974 | Eitreim | 280/79.11 |
| 3,831,959 | A * | 8/1974 | Fontana | 280/79.11 |
| 4,178,006 | A * | 12/1979 | Johnson | 280/79.11 |
| 4,322,049 | A * | 3/1982 | Holland et al. | 248/154 |
| D340,563 | S * | 10/1993 | Kean et al. | D34/23 |
| 6,382,643 | B1 * | 5/2002 | Baker | 280/79.11 |

* cited by examiner

Primary Examiner—Hau Phan
(74) Attorney, Agent, or Firm—Albert O. Cota

(57) ABSTRACT

A collapsible cross-arm dolly for conveyance of weighted articles. The dolly consists of an upper arm (20) and a lower arm (24) of square metallic tubing, with each formed with a horizontal offset center portion (22) and (26) and with a pair of casters (30) that are attached at each end of both arm's lower surface. The horizontal offset center portion (22) is formed in opposite hand or mirror image of each other, thus permitting them to nest together and are both oppositely flattened to allow nesting on the same horizontal plane. A pivot junction (32) is mutually disposed between the arms, thereby permitting the dolly to form a pivotal right angle cross position (36), or alternatively, a pivotal parallel arm collapsed position (38). A gravity-actuated restraint (50) locks and disengages the connection of the upper arm to the lower arm, which permits changing orientation from the right angle cross position (36) to the parallel arm collapsed position (36). A second embodiment is basically identical except a manual push-button restraint (78) is utilized instead of being operated by a gravity actuated restraint.

19 Claims, 6 Drawing Sheets

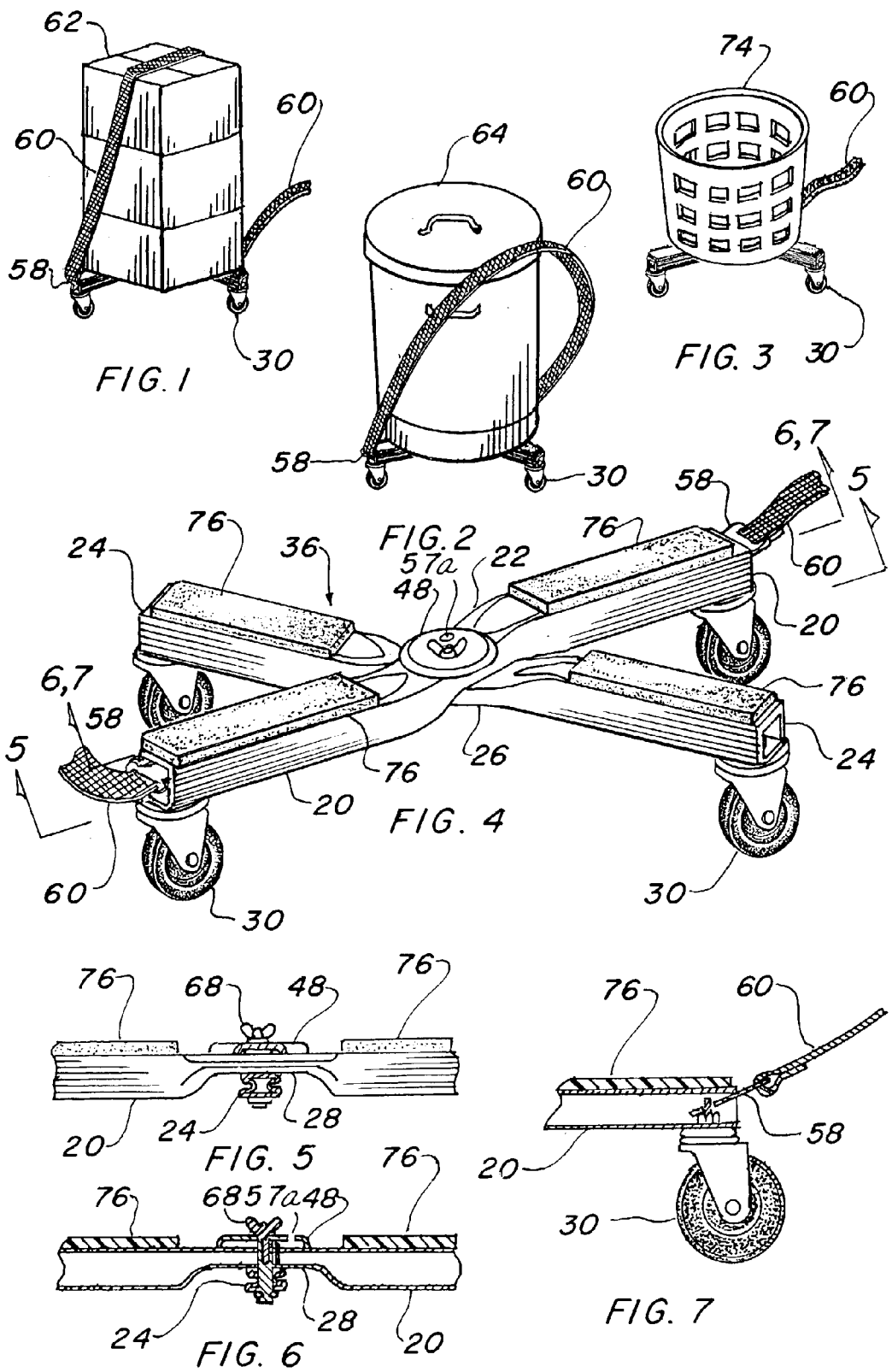

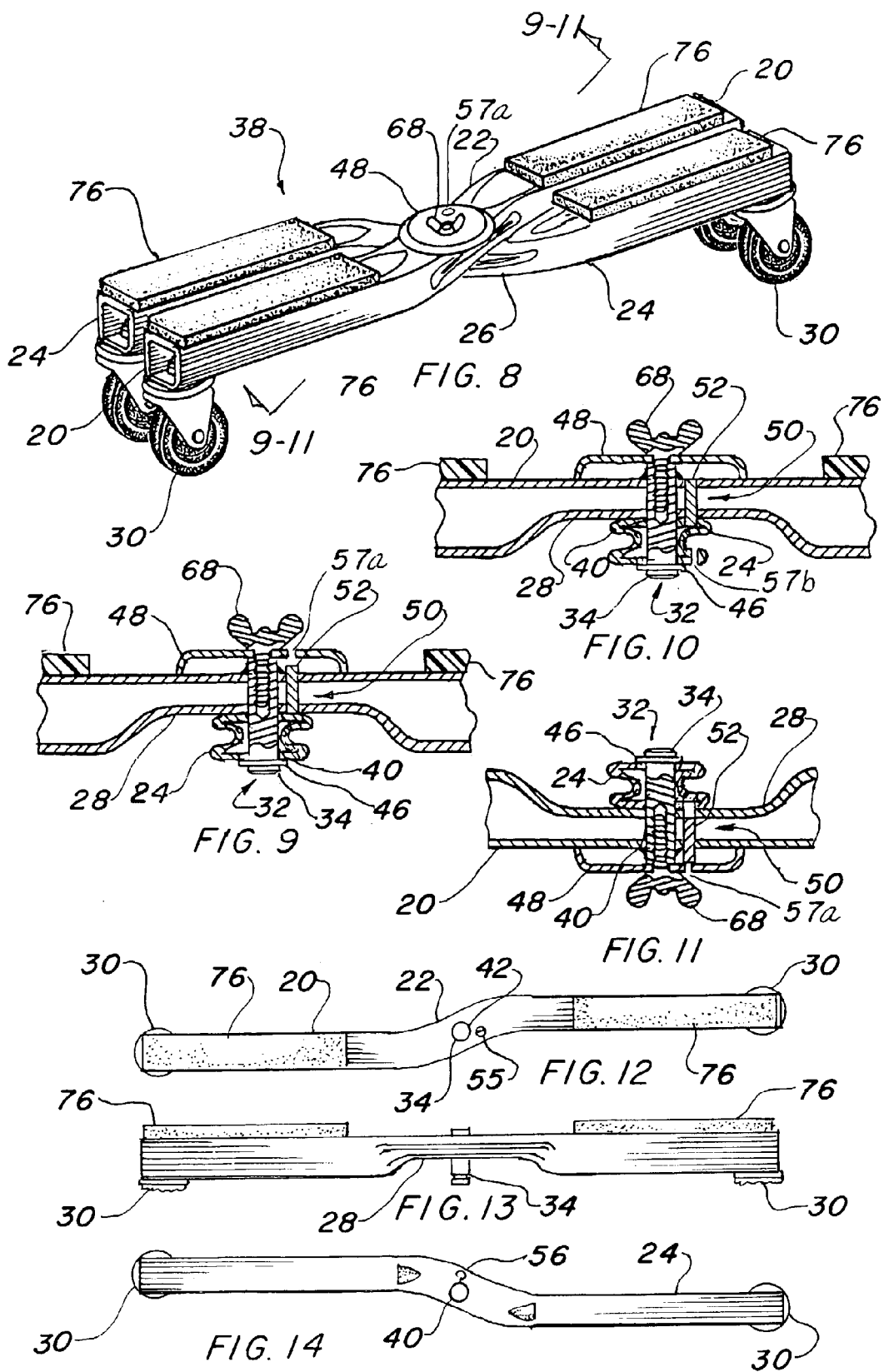

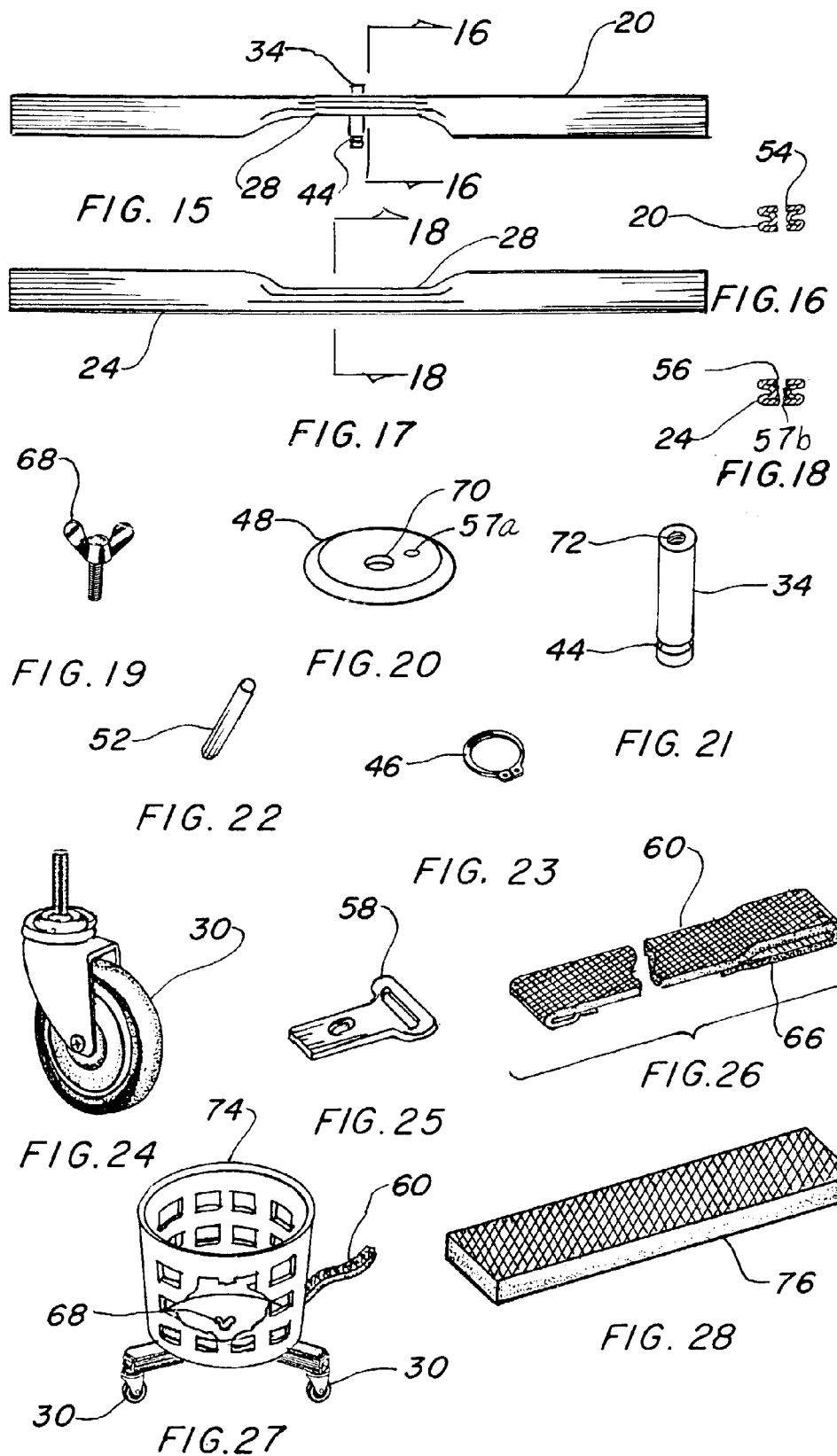

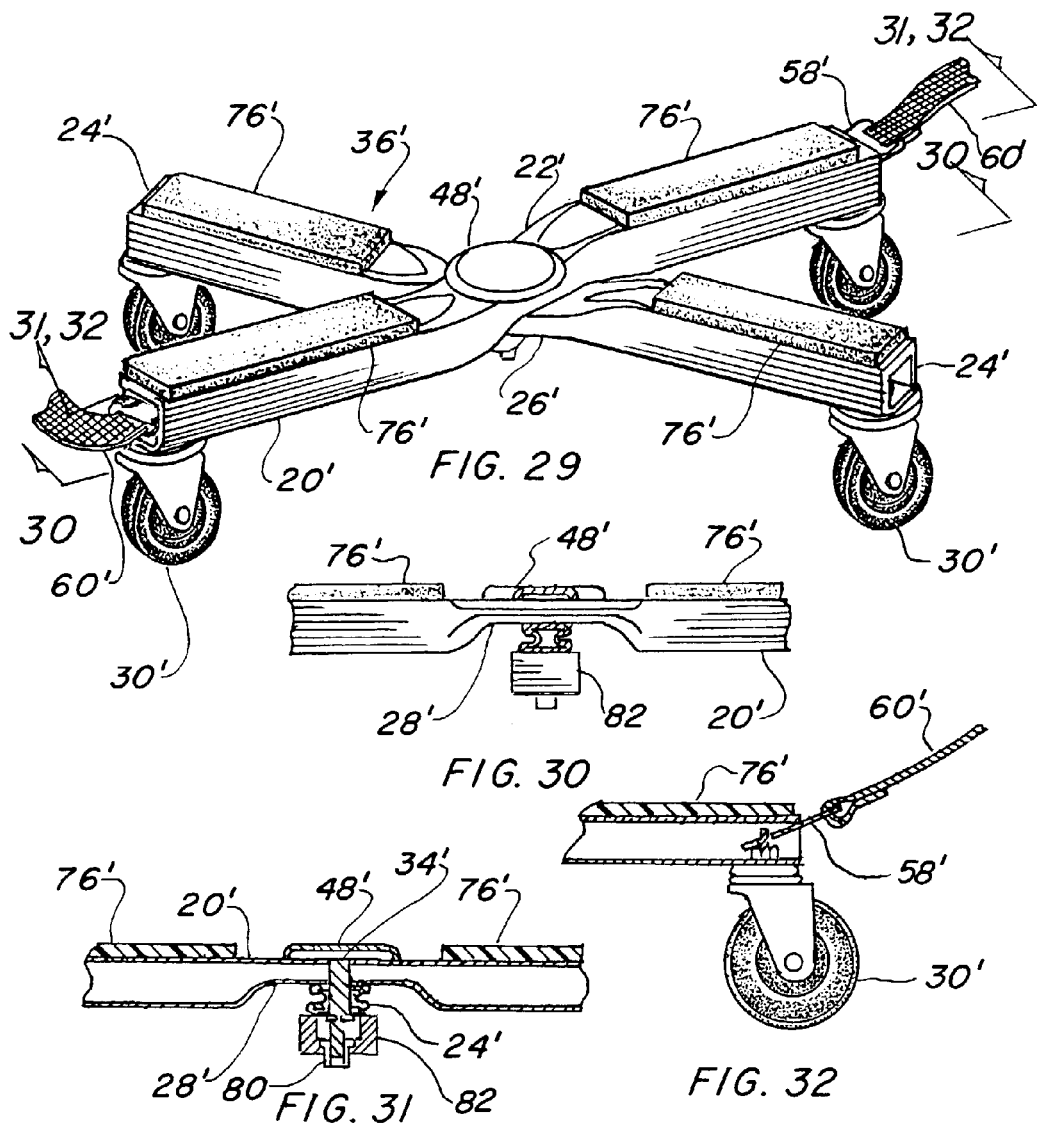
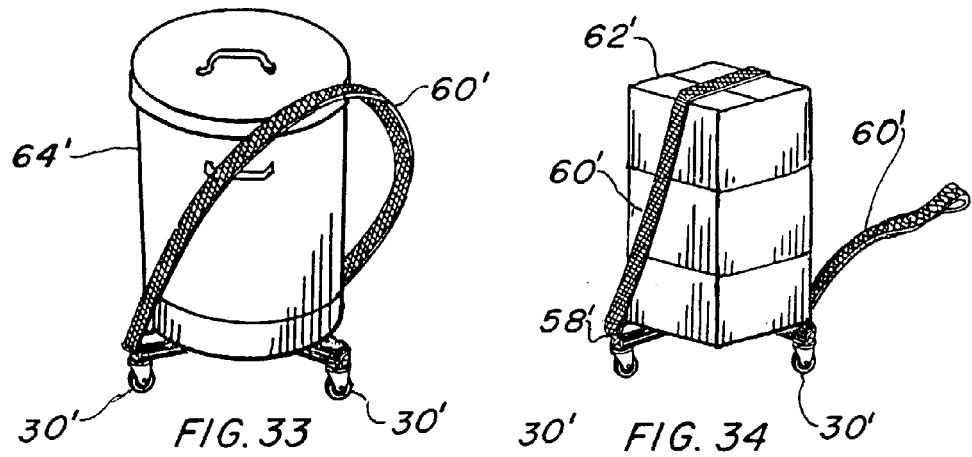

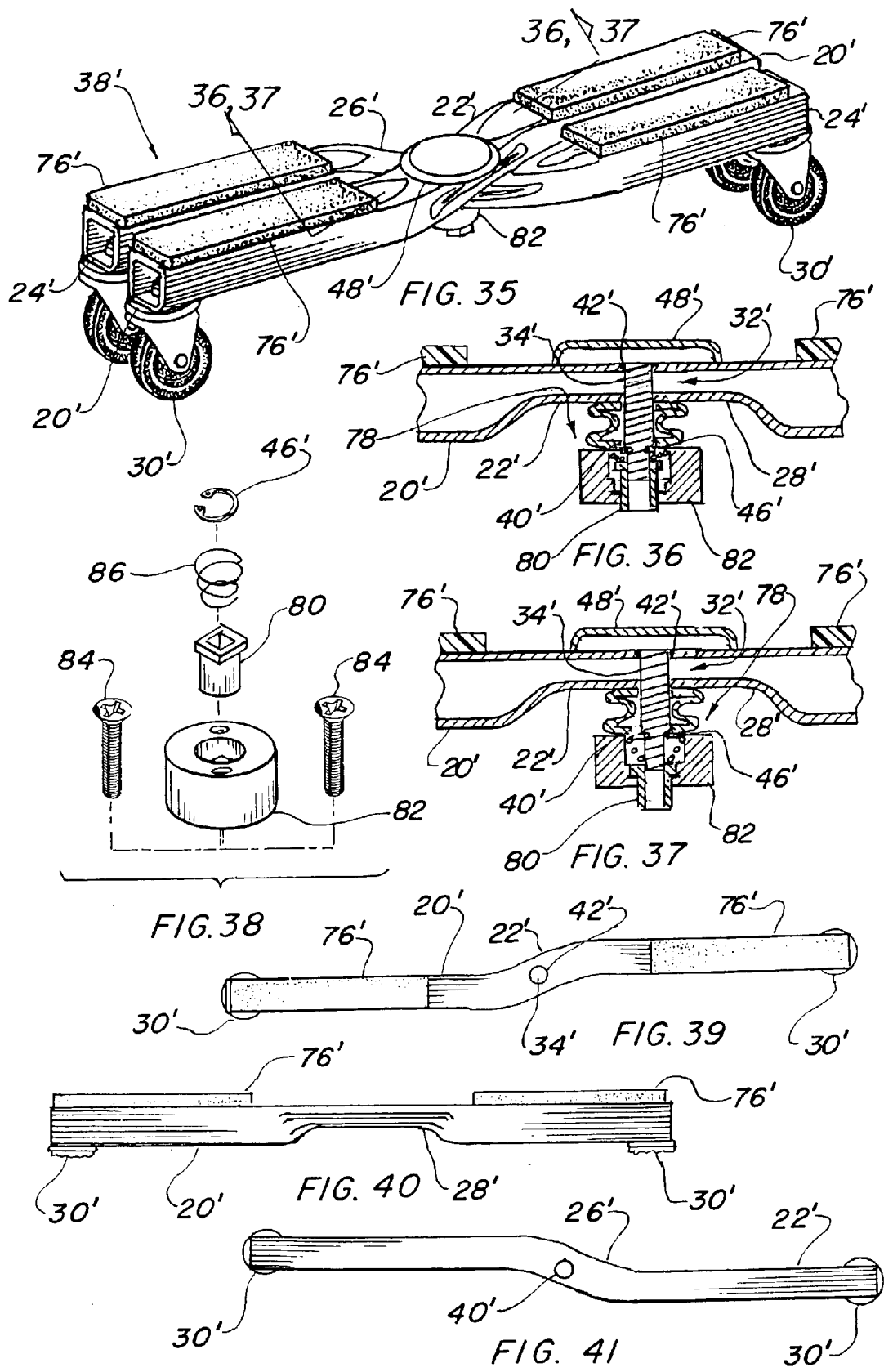

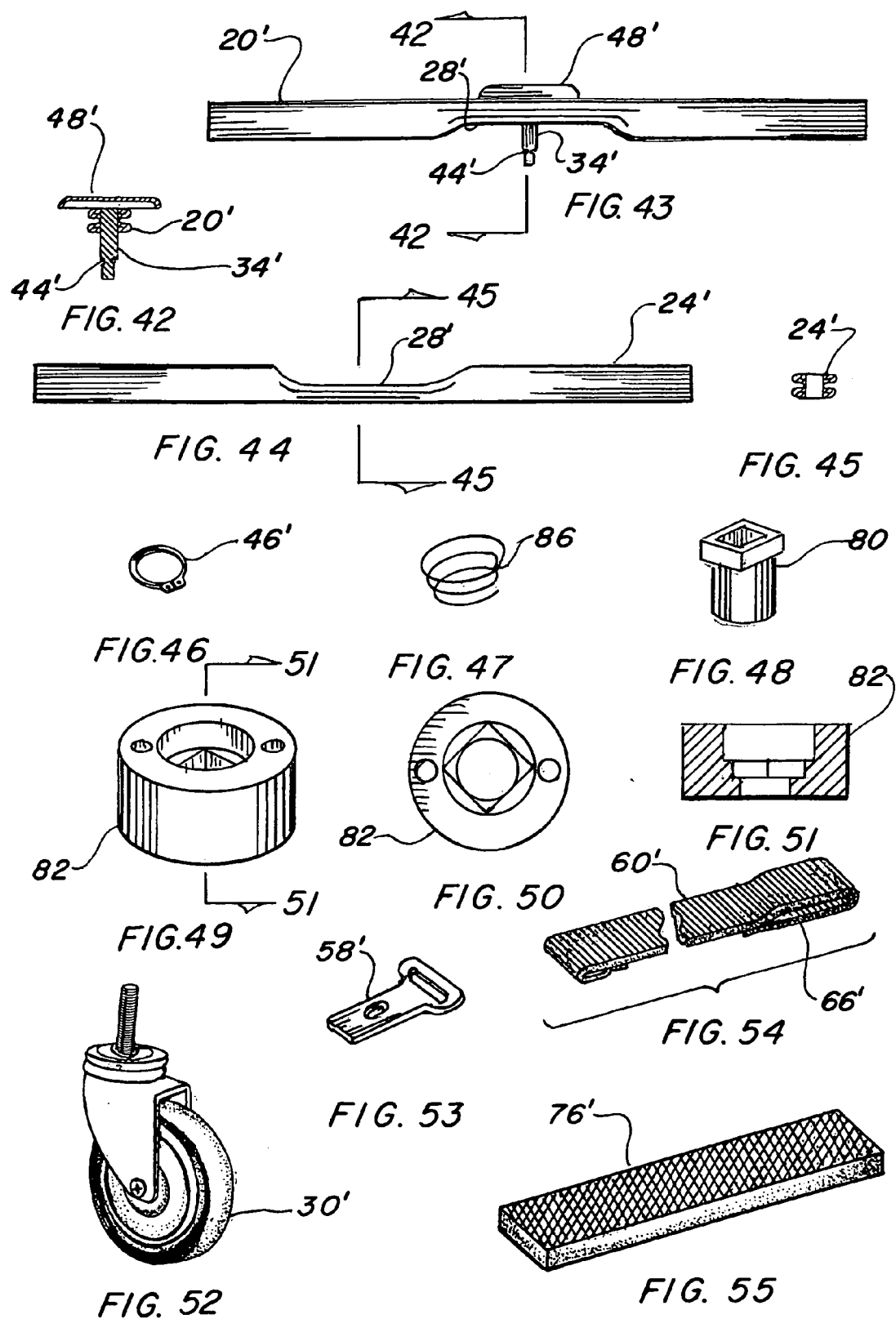

COLLAPSIBLE CROSS-ARM DOLLY

TECHNICAL FIELD

The invention generally pertains to weight-moving dollies, more specifically to a four-caster, cross-arm dolly that collapses which achieves a reduction in size for convenient transportation and storage.

BACKGROUND ART

Previously, devices for moving relatively small cargo and personal items, such as luggage, have been limited to wheeled trucks which are usually constructed of a robust material with a toe plate extending near the bottom for stacking the cargo or luggage. Many varieties and styles of trucks, which are also known as "dollies", have been used, such as a continuous handle type, bicycle handle, pistol grip handle, single and double loop style, and also "S" pin or tee-type handles. All of these varieties use the same principle of stacking with gravity and holding the items against the dolly's frame when angled backward toward the operator. The two wheels provide the mobility and steering is accomplished manually.

For larger quantities of cargo or luggage, four-wheeled platform trucks are used with two steerable wheels and a raised superstructure. While these types of trucks are effective, they are usually cumbersome and built to a size that makes it difficult for a single person to use, especially when loaded with heavy items.

Other trucks, such as a wagon type using steerable wheels attached to a towing arm or tongue, have also been utilized. Dollies using four castors, with either two swivel and two rigid, or all four swivel, are common for moving articles and are constructed with rigid decking, such as wood or a tubular structure.

These trucks are also effective, but as in the case of the four-wheeled platform truck, they are usually designed and built for carrying and transporting a relatively larger amount of cargo. Thus, they are not practical for a single person who is transporting a load of cargo for his or her own use.

A search of the prior art did not disclose any patents that read directly on the claims of the instant invention, however the following U.S. patents were considered related:

| U.S. PAT. NO. | INVENTOR | ISSUED |
|---|---|---|
| 6,382,643 | Baker | May 7, 2002 |
| 4,647,056 | Baker | Mar. 3, 1987 |
| 4,274,644 | Taylor | Jun. 23, 1981 |
| 2,869,241 | Owen | Aug. 26, 1958 |
| 2,661,220 | Davis | Dec. 1, 1953 |

The U.S. Pat. No. 6,382,643 patent discloses a portable cross-framed dolly that is designed to accept and transport various, loose items or to have attached a container, such as a laundry basket, into which items can be placed. The dolly consists of a first frame having a downward-projecting first frame slot and a second frame having an upward-projecting second frame slot. When the two slots interface, the upper surfaces and lower surfaces of the two frames are on the same plane to thus, form a stable platform. To the lower surfaces and near the first and second ends of each of the two frames is attached a caster which allows the dolly to easily roll when being pulled. The pulling is facilitated by a flexible pull strap which is removably attached to either the first end or the second end of the first frame.

The U.S. Pat. No. 4,647,056 patent discloses a portable luggage carrier having a structural frame that include resilient mounting surface that accepts luggage and castors that provide mobility. The structural frame provides a rigid mounting surface and attachment for the castors that are retractable into the frame. A flexible towing strap is interposed with the frame and encompasses luggage that is juxtaposed on the mounting surface. The strap is tightened with a buckle and the remaining end becomes a hand-held towing strap.

The Taylor patent discloses a four-wheeled hand truck that is comprised of a platform, a pair of wheel-connecting bars rotatably attached to the platform, a plurality of rotatable wheels, and a handle that is pivotally connected at two points on each of the platform. A handle release and locking means attaches to the platform and locks the handle member either in an open or a closed position. The wheels fold up underneath the platform when the handle member is in the closed position.

The Owen patent describes a device for carrying a kitchen stove or the like. The invention comprises two body parts of the same width but of longer and shorter extent. The two parts are hinged together in such a manner that they may first occupy an extended position upon a floor so as to permit the stove or the like to be placed in upright position upon the larger body part. The other body part may then be lifted to an upright position and the stove can be strapped in.

The Davis patent discloses a wheel assembly for carrying suitcases or the like. The invention comprises a platform having a set of wheels provided on brackets. The platform can be folded with the wheels against a surface of the suitcase so that they will project a minimum distance from the suitcase consistent with being wholly outside of the normal contour of the suitcase. The folding brackets are detachably-mounted on plates which are easily and permanently secured to the outside of the case.

For background purposes and as indicative of the art to which the invention relates, reference may be made to the following remaining patents found in the search:

| PATENT NO. | INVENTOR | ISSUED |
|---|---|---|
| 4,273,222 | Cassimally, et al | June 1981 |
| 4,178,006 | Johnson | Dec. 11, 1979 |
| 3,963,256 | Stafford | June 1976 |
| 3,831,959 | Fontana | Aug. 27, 1974 |
| 3,488,062 | Walda | January 1970 |
| 2,484,951 | Kubo | October 1949 |
| 2,471,553 | Zuckerman | May 1949 |
| D340,563 | Kean, et al | Oct. 19, 1993 |
| 27,784 | Gander | Oct. 26, 1897 |
| 375,406 | Wilson, et al | Dec. 27, 1887 |

DISCLOSURE OF THE INVENTION

Dollies have been used for centuries for transporting items that are too heavy or bulky to be moved by hand. The most commonly used dollies at the present time, utilize some type of casters or wheels to provide mobility. There are a myriad of types and special-use dollies available in today's marketplace, such as movers dollies, drum dollies, pull handle dollies, barrel dollies, furniture dollies, machinery dollies and a host of others. The so-called cross-arm dollies are popular today and consist of a pair of arms with casters on the ends attached together in the middle. This type of dolly is particularly well adapted to handle barrels, drums, crates, cartons, trash cans, laundry baskets, and similar items.

The commonly available cross-arm dolly is rigidly attached together in the middle and is simple in its construction since there are only two main structural members. The only drawback in this type of construction is that, while it is flat, it is also large in width and breadth, and the legs must be wide enough to balance and maintain the load.

A need has existed for some time to have a cross-arm dolly that is easy to transport and store when not in use. Therefore, the primary object of the invention is to provide a cross-arm dolly that pivots in the middle and collapses into a smaller area, thus reducing the width by almost half. This functional utility does not affect the structural integrity of the dolly as the arms are basically unchanged and only a pivot junction replaces the rigid attaching hardware.

An important object of the invention is that the cross-arm dolly is easy to grip and manage in its collapsed position. The dolly may be held comfortably in one hand and carried in either a vertical or horizontal position without the awkwardness of the arms distending at right angles in the conventional configuration.

Another object of the invention is its ability to be stored on shelf or in a drawer when not in use. Normally, a cross-arm dolly is too large to store on a standard width shelf as it is too wide and protrudes beyond the limits of the shelf. The present invention precludes this problem by folding or rotating the arms until they are contiguous with one another, thus permitting easy storage since the length has not the problem and the width has been reduced to be within the size restrictions of the shelf.

Still another object of the invention is realized by requiring a much smaller container for shipping a newly produced dolly, which may be shipped in its collapsed position. The collapsed dolly requires considerably less space, thereby allowing a shipping container to be utilized that is much smaller and less expensive.

Yet another object of the invention is that the dolly is easy to display in a retail establishment in its collapsed position.

Another object is that the dolly takes up less valuable display space and it is easy to understand its operation since its overall purpose is intuitively obvious.

A further object of the invention is the ease of collapsing the dolly by using a securing and disengaging device to lock the arms in a cross position, which consists of a gravity actuated restraint in its preferred embodiment. When a user wants to change the arms from the cross position to the collapsed position, the dolly is simply turned upside down. Once the dolly is upside down, a cylindrical pin falls by gravity, which disengages both arms, thereby permitting manual rotation to a side by side relationship of the arms. A second embodiment is also simple and easy to employ as it only requires a user to depress a button beneath the pivot junction to disengage the cross position of the dolly. In both embodiments, the mechanism locks the arms together securely when in the cross position.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of a load of boxes stacked on the preferred embodiment of the cross-arm dolly in its extended right angle configuration with the towing strap looped over the stack to maintain balance.

FIG. 2 is a partial isometric view of a trash can positioned on top of the preferred embodiment of the cross-arm dolly in its extended right angle configuration with the towing strap looped onto both ends of the arms for ease of hauling.

FIG. 3 is a partial isometric view of a laundry basket attached to the top surface of the pivot junction with a thumb screw when the preferred embodiment of the cross-arm dolly in its extended right angle configuration.

FIG. 4 is a partial isometric view of the preferred embodiment illustrated rotated in its extended right angle cross position with the towing strap partially removed.

FIG. 5 is a partial cross-sectional view taken along lines 5—5 of FIG. 4.

FIG. 6 is a partial cross-sectional view taken along lines 6—6 of FIG. 4.

FIG. 7 is a partial cross-sectional view taken along lines 7—7 of FIG. 4 illustrating the quick disconnect catch attached to the threaded stud of the swivel caster.

FIG. 8 is a partial isometric view of the preferred embodiment of the cross-arm dolly illustrated rotated in its parallel arm collapsed position.

FIG. 9 is a cross-sectional view taken along lines 9—9 of FIG. 8 illustrating the dolly in the parallel arm collapsed arm position with the locking rod engaging only the upper arm.

FIG. 10 is a cross-sectional view taken along lines 10—10 of FIG. 8 illustrating the cross-arm dolly in the right angle cross position with the locking rod engaging both the upper arm and the lower arm.

FIG. 11 is a cross-sectional view taken along lines 11—11 of FIG. 8 illustrating the cross-arm dolly upside down in the right angle cross position with the locking rod fallen by gravity out of engagement with the lower arm, thus permitting the dolly to be manually folded into the parallel arm collapsed arm position.

FIG. 12 is a partial top elevational plan view of the upper arm in the preferred embodiment of the cross-arm dolly.

FIG. 13 is a partial side elevational view of the upper arm in the preferred embodiment of the cross-arm dolly.

FIG. 14 is partial a top elevational plan view of the lower arm in the preferred embodiment of the cross-arm dolly.

FIG. 15 is a side elevational view of the upper arm in the preferred embodiment of the cross-arm dolly, less casters and resilient pads.

FIG. 16 is a cross-sectional view taken along lines 16—16 of FIG. 15 illustrating the square metallic tubing formed by crushing in the offset center portion of the upper arm.

FIG. 17 is a side elevational view of the lower arm in the preferred embodiment of the cross-arm dolly, less casters and resilient pads.

FIG. 18 is a cross-sectional view taken along lines 18—18 of FIG. 17 illustrating the square metallic tubing formed by crushing in the offset center portion of the lower arm.

FIG. 19 is a partial isometric view of the thumb screw completely removed from the invention for clarity.

FIG. 20 is a partial isometric view of the flanged protective disc completely removed from the invention for clarity.

FIG. 21 is a partial isometric view of the pivot pin completely removed from the invention for clarity.

FIG. 22 is a partial isometric view of the locking rod completely removed from the invention for clarity.

FIG. 23 is a partial isometric view of the retaining ring completely removed from the invention for clarity.

FIG. 24 is a partial isometric view of one of the swivel casters completely removed from the invention for clarity.

FIG. 25 is a partial isometric view of the quick disconnect catch completely removed from the invention for clarity.

FIG. 26 is a partial isometric view of the towing strap completely removed from the invention for clarity.

FIG. 27 is a partial cut-away isometric view of a laundry basket attached to the top surface of the dolly on the protective disc with a thumb screw, when the preferred embodiment of the cross-arm dolly in its extended right angle configuration.

FIG. 28 is a partial isometric view of the resilient pad completely removed from the invention for clarity.

FIG. 29 is a partial isometric view of the second embodiment of the cross-arm dolly illustrated rotated in its extended right angle cross position.

FIG. 30 is a partial cross-sectional view taken along lines 30—30 of FIG. 29.

FIG. 31 is a partial cross-sectional view taken along lines 31—31 of FIG. 29.

FIG. 32 is a partial cross-sectional view taken along lines 32—32 of FIG. 29 illustrating the quick disconnect catch attached to the threaded stud of the swivel caster.

FIG. 33 is a partial isometric view of a trash can loaded on top of the second embodiment of the cross-arm dolly in its extended right angle configuration, with the towing strap looped onto both ends of the arms for ease of hauling.

FIG. 34 is a partial isometric view of a load of boxes stacked on the second embodiment of the cross-arm dolly in its extended right angle configuration, with the towing strap looped over the stack to maintain balance.

FIG. 35 is a partial isometric view of the second embodiment of the cross-arm dolly illustrated rotated in its parallel arm collapsed position.

FIG. 36 is a partial cross-sectional view taken along lines 36—36 of FIG. 35 illustrating the dolly in the parallel arm collapsed arm position with the square portion of the push button disengaged from the housing square recess.

FIG. 37 is a partial cross-sectional view taken along lines 37—37 of FIG. 35 illustrating the dolly in the parallel arm extended right angle cross position with the square portion of the push button engaging the housing square recess.

FIG. 38 is an exploded isometric view of the manual push button securement restraint assembly of the second embodiment.

FIG. 39 is a top elevational plan view of the upper arm in the second embodiment of the cross-arm dolly.

FIG. 40 is a partial side elevational view of the upper arm in the second embodiment of the cross-arm dolly.

FIG. 41 is a top elevational plan view of the lower arm in the second embodiment of the cross-arm dolly.

FIG. 42 is a partial cross-sectional view taken along lines 42—42 of FIG. 43 illustrating the square metallic tubing formed by crushing in the offset center portion of the upper arm and the round stud.

FIG. 43 is a side elevational view of the upper arm in the second embodiment of the cross-arm dolly, less casters and resilient pads.

FIG. 44 is a side elevational view of the lower arm in the second embodiment of the cross-arm dolly, less casters and resilient pads.

FIG. 45 is a cross-sectional view taken along lines 45—45 of FIG. 44 illustrating the square metallic tubing formed by crushing in the offset center portion of the lower arm.

FIG. 46 is a partial isometric view of the retaining ring completely removed from the invention for clarity.

FIG. 47 is a partial isometric view of the compression spring completely removed from the invention for clarity.

FIG. 48 is a partial isometric view of the square-to-round push button completely removed from the invention for clarity.

FIG. 49 is a partial isometric view of the push button housing completely removed from the invention for clarity.

FIG. 50 is a top elevational view of the push button housing completely removed from the invention for clarity.

FIG. 51 is a cross sectional view taken along lines 51—51 of FIG. 49.

FIG. 52 is a partial isometric view of the swivel caster completely removed from the invention for clarity.

FIG. 53 is a partial isometric view of the quick disconnect catch completely removed from the invention for clarity.

FIG. 54 is a partial isometric view of the towing strap completely removed from the invention for clarity.

FIG. 55 is a partial isometric view of the resilient pad completely removed from the invention for clarity.

BEST MODE FOR CARRYING OUT THE INVENTION

The best mode for carrying out the invention is presented in terms of a preferred and a second embodiment of a collapsible cross-arm dolly for the conveyance of weighted articles. The second embodiment only differs from the first embodiment in the method of disengaging the cross arms, thus allowing the arms to collapse in a parallel position. The preferred embodiment of the collapsible cross-arm dolly is shown in FIGS. 1 through 28 and is comprised of an upper arm 20 that includes an upper arm, horizontal offset center portion 22, and a lower arm 24 having a similar lower arm, horizontal offset center portion 26 however, it is a mirror image adaptation of the upper arm horizontal offset 22.

The upper arm 20 and lower arm 24 are both preferably formed of square metallic tubing, with the upper arm offset center portion 22 having a flattened section 28 on the arm's lower surface, or underside, as illustrated in FIGS. 5, 6, 9–11 and 13. The lower arm 24 offset center portion 26 also includes a flattened section 28 which is located on the arm's upper surface, thus permitting nesting of the upper arm 20 to the lower arm 24, thereby forming a parallel arm collapsed position, wherein the upper arm 20 and lower arm 24 essentially correspond with each other linearly, as shown in FIGS. 8–11. It should also be noted that the flattened section 28 of each arm 20 and 24 is reduced in size by approximately half to permit a parallel relationship with the remainder of the arms when juxtaposed together. While the preferred material for the arms 20 and 24 is hollow square metallic tubing, other materials may be use with equal ease such as wood, thermoplastic, fiberglass, or structural steel.

The upper arm 20 and lower arm 24 both incorporate a pair of casters 30 that are disposed on the lower surface of each arm 20, 24 and positioned at each arm's distal end, as shown in FIGS. 1–4, 7, 8, 12–14, and 24. Additionally, an optional center caster 30 can be disposed on the lower surface of the arm 24 to increase the load rating of the dolly. The casters 30 may be of any type or style, however a swivel type caster is preferred. The load rating and type of material for the wheel of the caster 30 may vary relative to the intended utility, as well as the attachment arrangement to fasten the caster 30 to the arms 20 and 24.

A pivot junction 32 is mutually disposed within the upper arm 20 and the lower arm 24, thereby orienting the two arms to form a pivotal right angle cross position 36, as illustrated in FIG. 4, or alternatively, a pivotal parallel arm collapsed position 38, as depicted in FIG. 8. Since both of the arms 20 and 24 have a horizontal offset center portion 22 and 26, as well as a flattened section 28 in opposed mirror image of each other, the design permits the parallel arm collapsed position 38 to locate each arm 20 and 24 on the same horizontal plane and nest together, as shown in FIGS. 4–6 and 8–11.

In the preferred embodiment the pivot junction 32 consists of a pivot pin 34 that is illustrated by itself in FIG. 21, and assembled in FIGS. 5, 6, and 9–11. The upper arm 20 and the lower arm 24 have a pivot pin clearance hole 40 through which the pin 34 connects the arms 20 and 24 together in a swiveling manner. The upper end of the pivot pin 34 utilizes a weld joint 42 that connects the pin 34 permanently to the upper arm 20. The clearance hole 40 in the lower arm 24 is large enough to allow the arm to swivel freely and yet tight enough to eliminate any unwanted play or slop. The pivot pin 34 further contains a retaining ring groove 44 with an external retaining ring 46 snapped into place after the arms are assembled, thus permitting rotation of the upper arm 20 relative to the lower arm 24 within the limits of the offsets 22 and 26. The retaining ring 46 is attached by a snap action within the groove 44 and provides simple and positive attachment of the two arms. Additionally, the retaining rung 46 may easily be removed for disassembly. A flanged protective disc 48 is attached to the upper surface of the upper arm center portion 22, preferably by welding or brazing. The disc 48, as illustrated by itself in FIG. 20, is utilized for decorative purposes as well as acting as an internal stop or retainer.

The preferred embodiment utilizes a gravity-actuated restraint 50 as the means for securing or disengaging the upper arm 20 and the lower arm 24 at the pivot junction 32, from either the right angle cross position 36 or the parallel arm collapsed position 38. The restraint 50 consists of a locking rod 52 that penetrates an upper arm thru-hole 54 located in the offset portion 22 of the upper arm 20, as depicted in FIGS. 9–12. The lower arm 24 has a cavity 56 on its upper surface that is in alignment with the thru-hole 54. When the arms 20 and 24 are in the right angle cross position 36, the locking rod 52 is disposed within the thru-hole 54, thereby permitting the locking rod 52 to fall by gravity into the cavity 56 in the lower arm 24 which locks the arms in the crossed position 36.

If the cross-arm dolly is inverted or turned upside down when in the right angle cross position 36, the locking rod 52 falls by gravity from the cavity 56. The dolly is then disengaged from the right angle cross position 36 which permits the dolly to be manually rotated to the parallel arm collapsed position 38, as shown in FIG. 8. It should be noted that the locking rod 52 seats in the cavity 56 only a small distance, thus releasing the lower arm 24 when inverted. The inner surface of the flanged protective disc 48 acts as a stop to retain the rod 52 in the raised position.

FIGS. 9–11 depict the functioning of the gravity actuated restraint 50 in cross section, with FIG. 9 illustrating the dolly in the parallel arm collapsed position 38 with the rod 52 elevated and its distal end resting on the upper surface of the lower arm 24, since it is not in alignment with the thru-hole 54. FIG. 10 shows the dolly in the right angle cross position 36 with the rod 52 penetrating and resting within the aligned cavity 56. FIG. 11 depicts the dolly in the inverted position with the rod 52 falling by gravity from the cavity 56 with its top contiguously engaging the inner surface of the disc 48. There are other methods of retaining the rod 52 in the lower arm 24 as a substitute for the cavity 56 that are also viable alternates, such as drilling a hole completely though the lower arm 24 and inserting a plug from the lower to the proper level and welding the plug in place on the lower surface of the arm. Another approach is to drill a hole completely through the lower arm 24 and insert a screw into the hole that has been threaded on the lower surface, when the functions as a stop for the locking rod 52. Other methods may also be considered as long as the cavity 56 has a lower surface of the proper depth to permit functioning of the rod 52.

Simply stated, the preferred embodiment of the invention is automatically locked in the right angle cross position 36 when the arms 20 and 24 are completely spread apart and the casters 30 are on the bottom in a normal functional position. To fold the dolly into the parallel arm collapsed position 38, the dolly is turned upside down, which automatically allows the arms 20 and 24 to be rotated and nested together for storage, as the rod 52 has been disengaged by the force of gravity. While in the stored position the arms 20 and 24 are free to be extended without further manipulation.

The dolly has an upper service aperture 57a directly above the locking rod 52 through the flanged protective disc 48. Further the dolly also has a lower service aperture 57b directly below the locking rod 52 with each aperture having an inside diameter less than the outside diameter of the locking rod 52. These apertures 57a and 57b permit a tool to be inserted into the appropriate aperture in the event that the rod 52 becomes jammed allowing the rod to be dislodged.

A towing strap 60 may be optionally fastened to the ends of either the upper arm 20 or lower arm 24 with removable attachment means in the form of a pair of quick disconnect catches 58, which are attached to a towing strap 60 for securing the load and/or manually pulling the dolly. One of the catches 58 is attached to the end of the strap 60 and the other catch 58 is free to slide along the strap 60, as shown in FIG. 1. The first catch 58 is inserted into the open end of the arm over the stud of the caster 30, as illustrated in FIG. 7. The strap 60 is then placed over the top of the load, which could be boxes 62 or trash cans 64, as pictorially shown, with the floating catch 58 inserted into the opposite end of the same arm. The distal end of the strap 60 contains a loop 66 for manually pulling the dolly. It may be clearly visualized that as the dolly is pulled, the strap 60 is tightened across the load and yet it is easily disconnected when the item reaches its destination. Further, the strap 60 may be used as a simple towing loop, as shown in FIG. 2, or a single catch 58 may be utilized for other applications where more length is required and a single caster is enough to steer properly.

To further the utility of the invention, a thumb screw 68 may be optionally added that attaches through a bore 70 in the flanged protective disc 48 and into a threaded hole 72 in the pivot pin 34, as illustrated in FIGS. 5, 6, 8–11 and 21. The thumb screw 68 is preferably the wing head type, as shown, and may be used to attach a laundry basket 74, as depicted in FIGS. 3 and 27, or a similar open topped container.

The arms 20 and 24 include a pair of resilient pads 76 that are attached to the upper surface of each end with pressure sensitive tape, cement or adhesive. The pads 76 are necessary to protect the dolly's load from damage and to provide a non-slip surface on the load bearing faces of the dolly.

The second embodiment is the same in its basic construction as the preferred embodiment, except for the pivot junction and the securing means to lock the arms in the right angle cross position. FIGS. 29 through 55 illustrate the complete second embodiment with the elements that are either the same or slightly different designated with a prime suffix such as "20'". The second embodiment is comprised of an upper arm 20' that includes an upper arm horizontal offset center portion 22', and a lower arm 24' also having a similar lower arm horizontal offset center portion 26'. However, the lower arm 24 is a mirror image adaptation of the upper arm horizontal offset 22'.

The upper arm 20' and lower arm 24' are both preferably formed of square metallic tubing, with the upper arm offset center portion 22' having a flattened section 28' on the arm's lower surface, or underside, as illustrated in FIGS. 30, 31, 36, 37 and 40. The lower arm 24' offset center portion 26' also includes a flattened section 28', which is located on the arm's upper surface, thus permitting nesting of the upper arm 20' to the lower arm 24', thereby forming a parallel arm collapsed position, wherein the upper arm 20' and lower arm 24' essentially correspond with each other linearly, as shown in FIGS. 35–37. It should also be noted that the flattened section 28' of each arm 20' and 24' is reduced in size by approximately half to permit a parallel relationship with the remainder of the arms when juxtaposed together. While the preferred material for the arms 20' and 24' is hollow square metallic tubing, other materials may be use with equal ease such as wood, thermoplastic, fiberglass, or structural steel.

The upper arm 20' and lower arm 24' both incorporate a pair of casters 30' that are disposed on the lower surface of each arm 20' and 24' and positioned at each arm's distal end, as shown in FIGS. 29, 32, 33–35, and 52. These casters 30' may be of any type or style, however a swivel type caster is preferred. The load rating and type of material for the wheel of the caster 30' may vary relative to the intended utility, as well as the attachment arrangement to fasten the caster 30' to the arm 20' and 24'.

A pivot junction 32' is mutually disposed within the upper arm 20' and the lower arm 24', thereby orienting the two arms to form a pivotal right angle cross position 36', as illustrated in FIG. 29, or alternatively, a pivotal parallel arm collapsed position 38', as depicted in FIG. 35. Since both of the arms 20' and 24' have a horizontal offset center portion 22' and 26', as well as a flattened section 28' in opposed mirror image of each other, the design permits the parallel arm collapsed position 38' to locate each arm 20' and 24' on the same horizontal plane and nest together, as shown in FIGS. 29, 30 and 35–37.

The second embodiment of the pivot junction 32' consists of a pivot pin 34' illustrated attached to the upper arm 22' by welding, as shown in FIGS. 36 and 37 and assembled in FIGS. 39–31, 37 and 43. The upper arm 20' and the lower arm 24' have a pivot pin clearance hole 40' through which the pin 34' is inserted, which jointly connects the arms together in a swiveling manner. The upper end of the pivot pin 34' utilizes a weld joint 42' that connects the pin 34' permanently to the upper arm 20'. The clearance hole 40' in the lower arm 24' is large enough to allow the arm to swivel freely and yet tight enough to eliminate any unwanted play or slop. The pivot pin 34' further contains a retaining ring groove 44' with an external retaining ring 46' snapped into place after the arms are assembled, thus permitting rotation of the upper arm 20' relative to the lower arm 24' within the limits of the offsets 22' and 26'. The retaining ring 46' within the groove 44' provides simple and positive attachment of the two arms and may easily be removed for disassembly. A flanged protective disc 48' is attached to the upper surface of the upper arm center portion 22', preferably by welding or brazing. The disc 48' as illustrated attached to the upper arm 20' in FIGS. 29–31, 35–37 and 43, is utilized for decorative purposes and covers the weld joint 42'.

The second embodiment utilizes a manual push button securement restraint 78 as the means for securing or disengaging the upper arm 20' and the lower arm 24' at the pivot junction 32', from either the right angle cross position 36' or the parallel arm collapsed position 38'. The restraint 78 consists of a spring-loaded, hollow square-to-round push button 80 and a push button housing 82 having both a round and a square recess within. The housing 82 is fastened to the lower arm 24' with screws 84, or the like, and the push button 80 is slideably disposed within the housing 82 such that when the push button 80 is depressed, the square portion of the push button 80 is detached from the housing square recess and enters the round portion, thereby disengaging the dolly from the right angle cross position 36' and permitting the dolly to be manually rotated to the parallel arm collapsed position 38'. A compression spring 86 is disposed between the lower arm and the push button housing, which urges the push button to extend beyond the housing until manually depressed.

During operation, the user simply presses on the push button 80 until it is almost flush with the housing 82 which moves the square portion of the button 80 away from the square recess in the housing and into the round portion, thus releasing the bottom arm 24' which allows the arm to rotate into the parallel arm collapsed position 38'. While the invention is in the stored position the arms 20' and 24' are free to be extended without further manipulation.

A towing strap 60' may be optionally fastened to the ends of either the upper arm 20' or lower arm 24' with removable attachment means in the form of a pair of quick-disconnect catches 58', which are attached to a towing strap 60' for securing the load and/or manually pulling the dolly. One of the catches 58' is attached to the end of the strap 60' and the other catch 58' is free to slide along the strap 60', as shown in FIG. 29. The first catch 58' is inserted into the open end of the arm over the stud of the caster 30', as illustrated in FIG. 32. The strap 60' is then placed over the top of the load, which could be boxes 62' or trash cans 64', as pictorially shown, with the floating catch 58' inserted into the opposite end of the same arm. The distal end of the strap 60' contains a loop 66' for manually pulling the dolly, as illustrated. It may be clearly visualized that as the dolly is pulled, the strap 60' is tightened across the load and yet it is easily disconnected when the item reaches its destination. Further, the strap 60' may be used as a simple towing loop, as shown in FIG. 33, or a single catch 58 may be utilized for other applications where more length is required and a single caster is enough to steer properly.

The arms 20' and 24' include a pair of resilient pads 76' that are attached to the upper surface of each end with pressure sensitive tape, cement or adhesive. The pads 76' are necessary to protect the dolly's load from damage and to provide a non-slip surface on the load bearing faces of the dolly.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A collapsible cross-arm dolly for conveyance of weighted articles comprising,
   a) an upper arm having an upper arm horizontal offset center portion, wherein said upper arm further having a pair of casters disposed on a lower surface thereof,
   b) a lower arm having a lower arm horizontal offset center portion opposite said upper arm horizontal offset, wherein said upper arm further having a pair of casters disposed on a lower surface thereof, c) a pivot junction mutually disposed within the upper arm horizontal offset center portion, and the lower arm horizontal offset center portion joining the upper arm and the lower arm together to form a pivotal right angle cross, or alternatively, a pivotal parallel arm collapsed position, and d) a gravity-actuated restraint for both locking and disengaging the upper arm to the lower arm, thus permitting changing orientation from a right angle cross position to a parallel arm collapsed position.

2. The cross-arm dolly as recited in claim 1 wherein said upper arm and said lower arm are formed of square metallic tubing with said casters positioned on each distal end.

3. The cross-arm dolly as recited in claim 2 wherein said upper arm comprises an upper surface and a lower surface with said upper arm offset center portion flattened on the lower surface, said lower arm comprises an upper surface and a lower surface with said lower arm offset center portion flattened on the upper surface, thus permitting nesting of the upper arm to the lower arm and forming a parallel arm collapsed position where the upper arm and the lower arm essentially correspond with each other linearly.

4. The cross-arm dolly as recited in claim 1 wherein said upper arm casters and said lower arm casters further comprise a swivel type caster.

5. The cross-arm dolly as recited in claim 1 wherein said pivot junction further comprises a pivot pin having a retaining ring groove, with said pin permanently attached to the upper arm's upper surface and a retaining ring snapped into the groove after the upper arm and the lower arm are nested together.

6. The cross-arm dolly as recited in claim 1 wherein said gravity-actuated restraint further comprises a locking rod, wherein said upper arm having a thru-hole in the offset portion and said lower arm having a cavity therein in alignment with said thru-hole when the arms are in a right angle cross position, the locking rod disposed within the thru-hole permitting the locking rod to fall by gravity into the cavity, when in an upright horizontal position, in the lower arm thereby locking the arms in the crossed position.

7. The cross-arm dolly as recited in claim 6 wherein when said cross-arm dolly is inverted in the right angle cross position, the locking rod falls by gravity from the cavity and disengages the dolly from the right angle cross position, thereby permitting the dolly to be manually rotated to the parallel arm collapsed position.

8. The cross-arm dolly as recited in claim 7 further comprising said dolly having an upper service aperture directly above said locking rod and said dolly having a lower service aperture directly below said locking rod each having an inside diameter less than the diameter of the locking rod such that a tool may be inserted into one of the apertures in the event that the rod becomes jammed permitting the rod to be dislodged.

9. The cross-arm dolly as recited in claim 1 further comprising a towing strap that is fastened to at least one arm with removable attachment means for manually pulling the dolly.

10. The cross-arm dolly as recited in claim 9 wherein said removable attachment means further comprising at least one quick disconnect catch attached to the towing strap.

11. A collapsible cross-arm dolly for conveyance of weighted articles comprising, a) an upper arm having a upper arm horizontal offset center portion, wherein said upper arm further having a pair of casters disposed on a lower surface thereof, b) a lower arm having a lower arm horizontal offset center portion opposite said upper arm horizontal offset, wherein said upper arm further having a pair of casters disposed on a lower surface thereof, c) a pivot junction mutually disposed within the upper arm horizontal offset center portion, and the lower arm horizontal offset center portion joining the upper arm and the lower arm together to form a pivotal right angle cross, or alternatively, a pivotal parallel arm collapsed position, and d) a manual push-button securement restraint for either locking or disengaging the upper arm to the lower arm, thus permitting changing orientation from a right angle cross position to a parallel arm collapsed position.

12. The cross-arm dolly as recited in claim 11 wherein said upper arm and said lower arm are formed of square metallic tubing with said casters positioned on each distal end.

13. The cross-arm dolly as recited in claim 12 wherein said upper arm comprises an upper surface and a lower surface with said upper arm offset center portion flattened on the lower surface, said lower arm comprises an upper surface and a lower surface with said lower arm offset center portion flattened on the upper surface, thus permitting nesting of the upper arm to the lower arm and forming a parallel arm collapsed position where the upper arm and the lower arm essentially correspond with each other linearly.

14. The cross-arm dolly as recited in claim 11 wherein said upper arm casters and said lower arm casters further comprise a swivel type caster.

15. The cross-arm dolly as recited in claim 11 wherein said pivot junction further comprises a pivot pin having a square distal end, and said pin having snap ring groove adjacent to the square end, wherein said pin is permanently attached flush to the upper arm's upper surface and a retaining ring snapped into the groove after the upper arm and the lower arm are nested together.

16. The cross-arm dolly as recited in claim 15 wherein said manual push-button securement restraint further comprises a spring-loaded, hollow square-to-round push button and a push-button housing, said housing having a square recess within and the housing fastener to the lower arm, said push-button slideably disposed within the housing such that when the push button is depressed, the square portion of the push button is detached from the housing square recess which disengages the dolly from a right angle cross position and permits the dolly to be manually rotated to the parallel arm collapsed position.

17. The cross-arm dolly as recited in claim 16 wherein said spring-loaded, hollow square-to-round push button further having a compression spring disposed between the lower arm and the push-button housing urging the push-button to extend beyond the housing until manually depressed.

18. The cross-arm dolly as recited in claim 11 further comprising a towing strap fastened at least one arm with removable attachment means for manually pulling the dolly.

19. The cross-arm dolly as recited in claim 18 wherein said removable attachment means further comprising at least one quick-disconnect catch attached to the towing strap.

* * * * *